UNITED STATES PATENT OFFICE.

CARLETON ELLIS, OF LARCHMONT, NEW YORK.

COMPOSITION FOR LAYING ROAD-DUST.

1,119,500.  Specification of Letters Patent.  Patented Dec. 1, 1914.

No Drawing. Application filed September 9, 1907, Serial No. 391,886. Renewed October 20, 1914. Serial No. 867,665.

*To all whom it may concern:*

Be it known that I, CARLETON ELLIS, a citizen of the United States, and a resident of Larchmont, in the county of Westchester and State of New York, have invented certain new and useful Improvements in Compositions for Laying Road-Dust, of which the following is a specification.

This invention relates to an improved composition of matter for laying road dust and preventing the occurrence of dust thereon and comprises waste sulfite cellulose liquor from paper mills and a softening agent either of a hydroscopic character, such as a deliquescent salt or of an oily character, such as a non-tarry oil, or both.

This application is directed to a composition for laying road dust, as is also Letters Patent No. 865,578, for a composition for laying road dust granted to me September 10, 1907, this application having been copending with the application upon which said Letters Patent No. 865,578 was granted. Sulfite liquor of from say 20° to 30° Baumé is preferably employed although the concentrated liquor is not essential, it being possible to work with diluted solutions. However for most purposes I prefer the liquor in a concentrated form approaching the consistency of molasses. Such concentrated liquor alone has the disadvantage of drying on exposure to the air to form a hard brittle mass, a property which renders it less fit for use by itself as a dust-layer. The addition of a softening compound however overcomes this objection and adapts the liquor for general use in the prevention of road dust.

The softening agent which I preferably employ is a deliquescent salt such as the chlorid of calcium or magnesium. The amount which may be added to the liquor is dependent on the concentration and quality of the said liquor. Too great a quantity of the chlorid "salts out" the lignosulfonate or other bodies present in the liquor. I prefer to use a fairly large amount of the deliquescent body, not sufficient to "salt out" but enough to cause some part at least of the otherwise soluble constituents of the liquor to assume a colloidal or gelatinous state. In this condition the liquor seems particularly effective. Another softening agent that may be used to advantage is a non-tarry oil. The selection of the oil or oily body is of some importance. Heavy petroleum oils free from tar are best. Tarry matter, as distinguished from oily matter or oily bodies, is, generally speaking, objectionable. When well prepared from tar-free oils, there appears to be a combination of the oily matter with the components of the liquor, resulting in a product of unusual virtue. The presence of the oil tends to soften the solid residue from the concentrated waste sulfite liquor, and assists in binding the particles of dust together in the well-known manner. A non-tarry oil is much better for this purpose than an oil containing tarry constituents, as the former emulsifies much better and spreads throughout the body of the solid residue much more readily than in the case of a tarry oil.

An illustrative formula representing the preferred form of my invention consists of 100 parts by weight of 30° Baumé liquor, 15 parts of water in which is dissolved 10 parts of commercial calcium chlorid and 25 parts of petroleum oil. The 25 parts of the calcium chlorid solution are added with stirring gradually to the liquor and the oil then emulsified into the resulting mixture.

Obviously other salts than those mentioned may be used or added but calcium and magnesium chlorids are especially useful because of their powerful hydroscopic action and cheapness. A modicum of a disinfectant such as creosote is sometimes desirable, but ordinarily not necessary owing to the disinfecting action of the compounds previously specified. To prevent the growth of weeds acid bodies or arsenicals, etc., may be added.

The composition diluted with water, ordinarily, is applied by the process of sprinkling or spraying the road bed thereby impregnating the surface layers with a cementing and hardening compound giving a firm surface and dust free roads, the said roads being of course, as is well known, composed largely of clay or clay-yielding materials, whereby a road comprising clay or clay-yielding materials, and having its surface coated or sprinkled with a body of concentrated sulfite waste liquor, is obtained.

As the odor of petroleum is held by some as objectionable and as its action on rubber tires is sometimes marked I prefer to use not more than 20 to 25 per cent of oil in my compositions and in many cases omit the oil entirely.

An improved composition without oil consists of concentrated sulfite liquor 100 parts mixed with 20 parts of a 25% solution of calcium and magnesium chlorids; the salts being present in equal proportions. For ordinary highways the latter composition is oftentimes preferable while for railroad beds the preparation containing 20% or so of oil is highly satisfactory.

What I claim is:—

1. A composition for laying road dust comprising an emulsion of waste sulfite liquor of 30° Baumé and as a softening agent a non-tarry petroleum oil.

2. A composition for laying road dust comprising an emulsion of waste sulfite liquor of 30° Baumé, and an oily body, said oily body being present in an amount not exceeding twenty-five per cent.

3. A composition for laying road dust comprising concentrated waste sulfite liquor and an oily body, said oily body being present in an amount not exceeding 25 percentum.

4. A composition for laying road dust comprising concentrated waste sulfite liquor, a hydroscopic softening agent and a non-tarry oily body.

5. A composition for laying road dust comprising concentrated waste sulfite liquor and a substantially tar-free oil.

6. A composition for laying road dust consisting of 100 parts of concentrated waste sulfite liquor having a substantially neutral reaction, 15 parts of water, 10 parts calcium chlorid and 25 parts of oil.

Signed at Larchmont, in the county of Westchester and State of New York, this sixth day of September A. D. 1907.

CARLETON ELLIS.

Witnesses:
NATHANIEL L. FOSTER,
SAMUEL R. BELL.